United States Patent

[11] 3,618,100

[72] Inventor  Harold Adler
              Huckleberry Hill, Lincoln, Mass. 01773
[21] Appl. No. 797,820
[22] Filed     Feb. 10, 1969
[45] Patented  Nov. 2, 1971

[54] AIRCRAFT RADIO NAVIGATION APPARATUS
     4 Claims, 1 Drawing Fig.
[52] U.S. Cl. .................................................. 343/107,
                                                             343/102
[51] Int. Cl. ................................................... G01s 1/16
[50] Field of Search ....................................... 343/107,
                                                                102

[56]                References Cited
              UNITED STATES PATENTS
     3,234,552  2/1966  Bostwick ..................... 343/107

Primary Examiner—Rodney D. Bennett, Jr.
Assistant Examiner—Richard E. Berger
Attorney—Kenway, Jenney & Hildreth ABSTRACT: The radio navigation apparatus disclosed herein facilitates perception by the pilot of an aircraft of passage through the intersection of preselected bearings relative to selected radio beacons. Deviation from one of the bearings is indicated on a first indicator having a pointer which swings laterally to indicate course deviation in conventional manner while departure from the second bearing is indicated on an indicator having a pointer which swings vertically and which crosses the pointer of the first indicator. The second indicator is energized through a reversing switch which permits it to indicate progress relative to the intersection in the same manner for lateral locations of the respective radio beacon on either side of a course following the first bearing. Means are also provided for providing an audio signal, preferably the modulation of one of the received r.f. signals, as the intersection is passed.

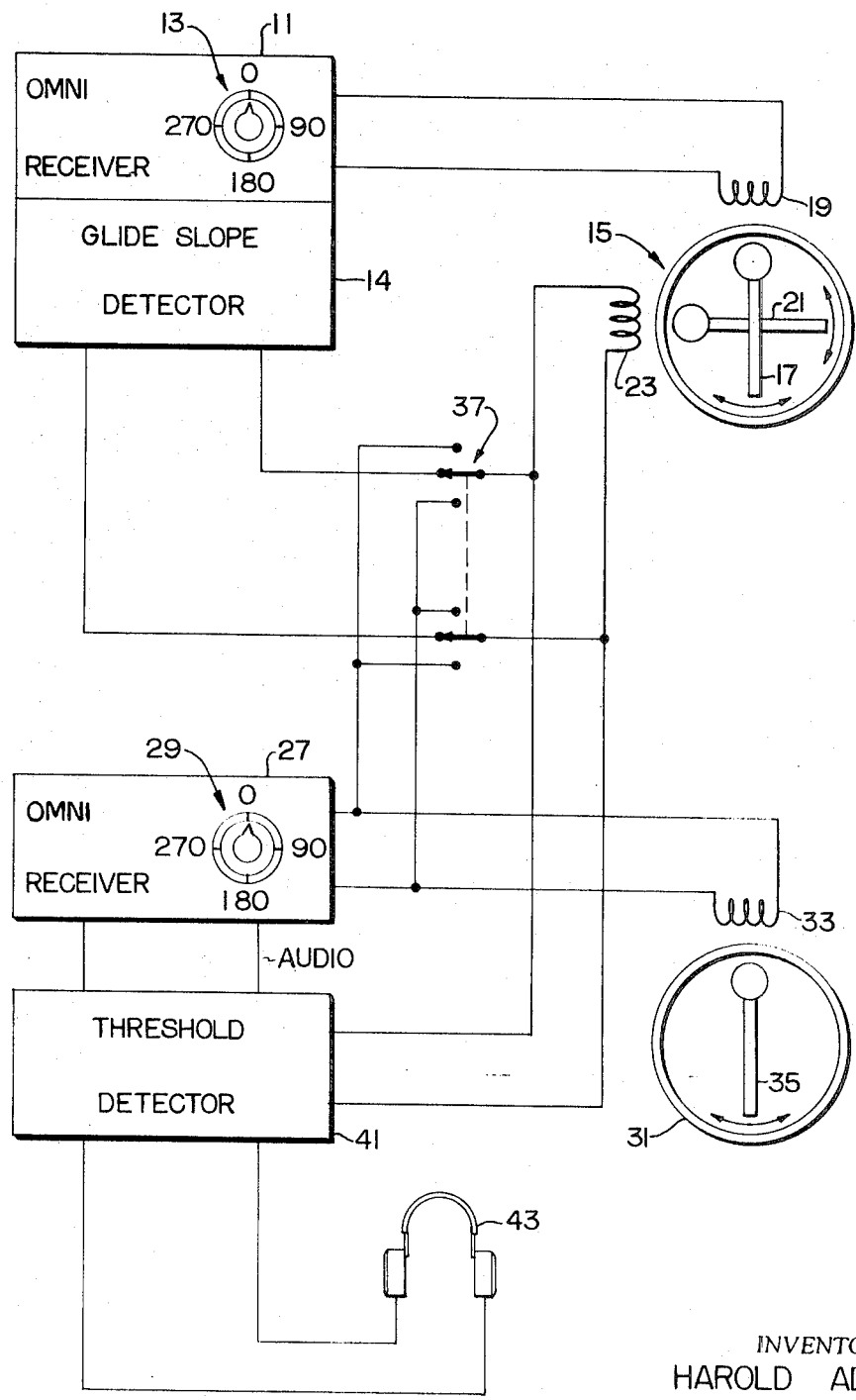

AIRCRAFT RADIO NAVIGATION APPARATUS

BACKGROUND OF THE INVENTION

At the present time, navigation of general aviation class aircraft is based principally upon the use of so-called omni or VOR radio beacons. Such beacons transmit a signal which permits an appropriately equipped aircraft to determine its bearing relative to the beacon. The omni receivers typically employed aboard such aircraft are conventionally arranged so that a given bearing, often referred to as a "radial," can be preselected. The receiver will then indicate, on a zero-center meter movement, deviation from the preselected bearing. The meter is conventionally arranged with a pointer which swings laterally, a turn toward the pointer being required to bring the aircraft back onto the desired bearing or course.

It is also relatively conventional practice to provide a pair of omni receivers aboard an aircraft. This redundancy not only provides a measure of safety in case of failure of one of the receivers, but also facilitates navigation by permitting a pilot to determine arrival at an intersection of preselected bearings relative to respective radio beacons. In navigation in this manner, however, confusion frequently arises due to the fact that the pointer controlled by the second omni receiver may swing either left to right or right to left as the aircraft traverses a preselected bearing intersection.

Among the several objects of the present invention may be noted the provision of radio navigation apparatus in which confusion or ambiguity relative to the traversing of an intersection of preselected bearings is eliminated; the provision of such apparatus with which can indicate progress relative to such an intersection in the same manner for lateral locations of the respective radio beacon on either side of the course; and the provision of such apparatus which is relatively simple and inexpensive.

SUMMARY OF THE INVENTION

Briefly, radio navigation apparatus according to the present invention employs a first radio receiver bearings providing a control signal which varies as a function of deviation from a first preselected bearing relative to a first selected radio beacon and a second radio receiver for providing a second control signal which varies as a function of deviation from a second preselected bearing relative to a second selected radio beacon. A display is provided which includes a first indicator having a pointer which swings laterally in response to signals applied to the first indicator and a second indicator having a pointer which swings vertically in response to signals applied to the second indicator. The first signal is applied to the first indicator while the second signal is applied to the second indicator through means including a reversing switch for permitting the polarity of the second signal to be reversed. Accordingly, the second indicator can indicate progress relative to the intersection of the two preselected bearings in the same manner for lateral locations of the second beacon on either side of a course following the first bearing.

BRIEF DESCRIPTION OF THE DRAWING

The single FIGURE is a block diagram of an aircraft radio navigation apparatus according to the present invention.

DESCRIPTION OF THE PREFERRED EMBODIMENT

Referring now to the drawing, there is indicated at 11 a conventional omni receiver. As is understood, receiver 11 is operative to provide a control signal which varies as a function of deviation or displacement of the receiver from a preselected bearing relative to a selected radio beacon or station. The particular bearing selected can be varied by means of a suitable control wheel or knob as indicated at 13.

Associated with omni receiver 11 is a glide slope detector 14. As is understood by those skilled in the art, such an instrument comprises part of an instrument landing system (ILS) which is useful in landing under restricted visibility conditions. This instrument provides a signal which varies as a function of vertical deviation from a desired glide path approaching a runway.

Omni receiver 11 and glide slope detector 14 are provided with a conventional combined display instrument as indicated at 15. This instrument includes a first indicator having a pointer 17 which is pivoted at the top of the instrument and which swings laterally in response to signals applied to a control winding 19. As is understood by those skilled in the art, this indicator essentially comprises a zero-center meter movement. The display instrument 15 also includes a second indicator or meter movement. The second indicator has a pointer 21 which is pivoted on the left-hand side of the instrument and which swings vertically in response to signals applied to a respective control winding 23.

A second omni receiver is indicated at 27. This receiver may be essentially identical with that indicated at 11 and includes a bearing selector, as indicated at 29, for selecting a particular bearing relative to a selected radio beacon. A display instrument 31 is associated with receiver 27. The control signal provided by the receiver 27 is applied to the control winding 33 of an indicator having a pointer 35 which is pivoted at the top of the instrument 31. If desired, a second glide slope detector and corresponding indicator may be associated with the omni receiver 27.

The winding 23 is selectively energized, through a two-pole three-position switch 37, by the signal provided by the glide slope detector 14 or that provided by the second omni receiver 27. With the switch 37 in its center position as shown, winding 23 is connected to the glide slope detector and the pointer 21 then operates in its conventional (ILS) mode. With the switch in its upper position, winding 23 is connected to the second omni receiver 27 with normal or positive polarization while with the switch 37 in its lower position, winding 23 is connected to the second omni receiver 27 with reversed or negative polarity. Thus, with regard to the second omni receiver 27, the switch 37 operates as a reversing switch.

The signal applied to the indicator control winding 23 is also applied to control a threshold detector circuit 41. As is understood by those skilled in the art, conventional omni receivers, such as those indicated at 11 and 27, typically also provide an audio output signal which responds to any modulation in the signal transmitted by the respective beacon. Such modulation typically comprises the call letters of the station, either in code or voice. In the apparatus illustrated, a threshold detector circuit 41 controls the application of the audio signal available from receiver 27 to a pair of head phones 43. The operation of the threshold detector circuit 41 is controlled by the same signal which is applied to the control winding 23. The threshold circuit operates to block the audio signal when the control signal applied thereto is below a predetermined level or threshold and to pass the audio signal when the control signal exceeds the predetermined level.

The operation of this apparatus in use is substantially as follows:

During normal cross-country navigation, the omni receiver 11 is tuned to a radio beacon lying on a line which is substantially in alignment with the desired course. The bearing selector 13 is then adjusted to the desired bearing or heading relative to the beacon. This setting determines the course to be flown. The omni receiver 27 is then turned to a radio beacon lying to one side or other of the course and the bearing selector 29 is adjusted to a bearing which intersects the course at an appropriate point. The switch 37 is then turned to its upper or lower position, depending upon whether the second radio beacon lies to the right or to the left of the desired course. The reversing action of the switch 37 then causes the action of the pointer 21 to be of the same whether the second beacon is on the right or the left of the course. For the purpose of this example, it is assumed that the polarity of the various signals is such that, prior to reaching the intersection, the pointer 21 will be deflected in a downward direction. The pointer 21 will then rise up through its level or neutral position as the aircraft traverses the intersection of the preselecting bearings or radials relative to the two selected radio beacons. As the selected course is followed, lateral deviations are indicated by the pointer 17 in a conventional fashion. Thus, the two pertinent indication are combined in a single display and the pilot does not have to visually search out two separate displays.

Since this apparatus employs a meter movement or indicator which is normally present, i.e. the glide slope indicator, it can be seen that the cost of radio navigation equipment according to the present invention is not greatly increased relative to conventional equipment. Further, there is substantially no interference between the two modes of operation since an indication of proper glide slope is not needed in cross-country navigation and, conversely, information regarding radio bearing intersections can be obtained from the second omni indicator 31 if such information should be needed during ILS landing procedures.

The operating threshold of threshold detector circuit 41 is adjusted so that the control voltage applied thereto operates to block the audio signal from the head phones 43 when the aircraft is still some distance from the bearing intersection but then passes the audio signal as or just before the intersection is reached. The audio signal, consisting typically of the radio beacon call letters, alerts the pilot that the selected intersection has been, or is about to be, reached. If desired, the threshold detector 41 could control the operation of a separate audio or visual indicator, e.g. a tone, a chime or a light, but the VOR audio signal is preferred.

In view of the foregoing, it can be seen that the several objects of the invention have been achieved and other advantageous results have been attained.

As various changes could be made in the above construction without departing from the scope of the invention, it is intended that all matter contained in the above description or shown in the accompanying drawings shall be interpreted as illustrative and not in a limiting sense.

What is claimed is:

1. Radio navigation apparatus comprising:
   first radio receiver means for providing a first control signal which varies as a function of deviation from a first preselected bearing relative to a first selected radio beacon;
   second radio receiver means for providing a second control signal which varies as a function of deviation from a second preselected bearing relative to a second selected radio beacon;
   display means including a first indicator having a pointer which swings laterally in response to signals applied to said first indicator and a second indicator having a pointer which swings vertically in response to signals applied to said second indicator;
   means for applying said first signal to said first indicator;
   means for applying said second signal to said second indicator including a reversing switch for permitting said second signal to be applied to said second indicator in either polarity, whereby said second indicator can indicate progress relative to the intersection of said preselected bearings in the same manner for lateral locations of said second beacon on either side of a course following said first bearing; and
   means responsive to the signal applied to said second indicator for providing an audible signal as said intersection is approached.

2. Apparatus as set forth in claim 1 wherein said audible signal comprises the modulation of radio signals transmitted by said second beacon.

3. In an aircraft navigation system having a combined display including a course deviation indicator and glide slope indicator and having a pair of omni receivers each of which is operative to provide a control signal which varies as a function of deviation from a preselected bearing relative to a selected radio beacon;
   means for applying the control signal from one of said omni receivers to said course deviation indicator;
   means for selectively applying the control signal from the other of said omni receivers to said glide slope indicator in either polarity; and
   means for providing an audible signal when the control signal from said other one of said omni receivers passes a predetermined threshold.

4. An aircraft navigation system as set forth in claim 3 wherein said audible signal comprises the modulation of radio signals received by said other one of said omni receivers.

* * * * *